Jan. 6, 1948.   C. W. JOHNSON   2,433,910
PUTTY COMPOSITION COMPRISING A POLYMETHACRYLATE AND FILLER
Filed June 14, 1944
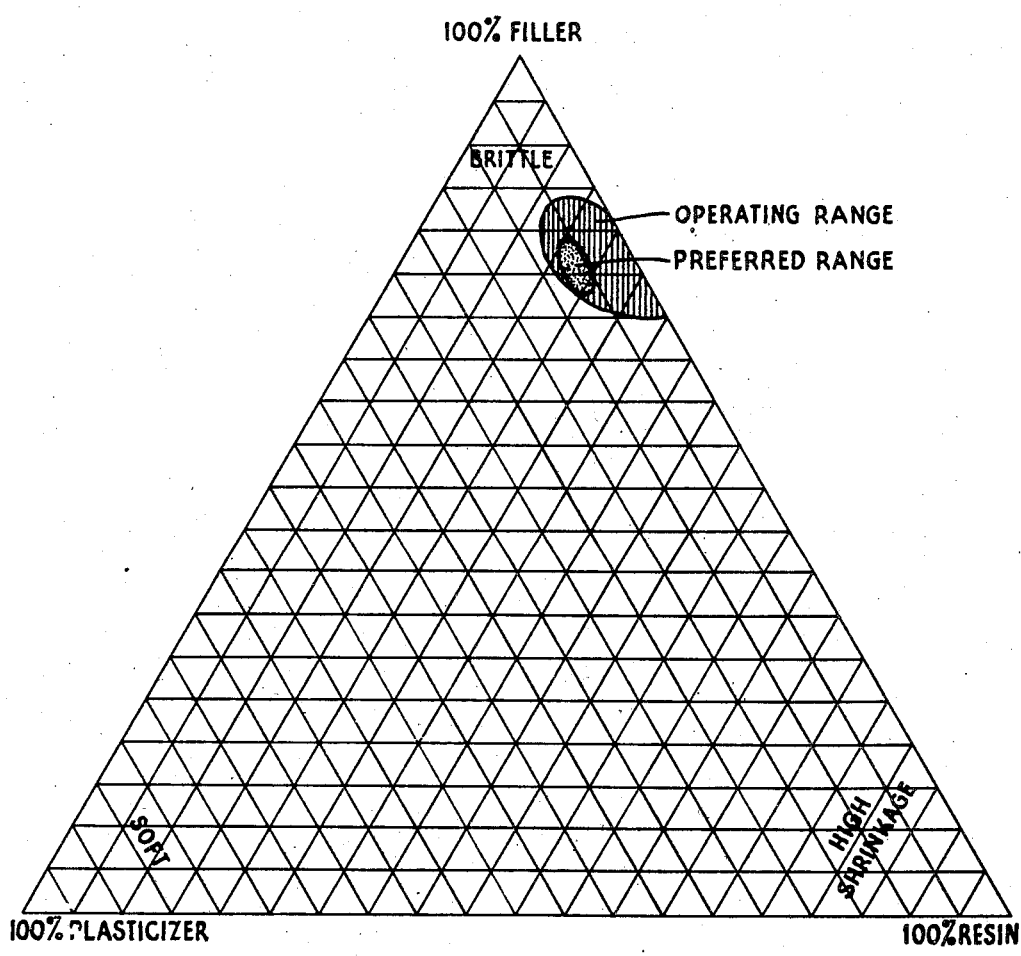
Charles W. Johnson   INVENTOR.
BY
Frank C. Hilberg   ATTORNEY Patented Jan. 6, 1948

2,433,910

UNITED STATES PATENT OFFICE 2,433,910

PUTTY COMPOSITION COMPRISING A POLYMETHACRYLATE AND FILLER

Charles W. Johnson, East Brunswick Township, Middlesex County, N. J., assignor to E. I. du Pont de Nemours & Company, Wilmington, Del., a corporation of Delaware Application June 14, 1944, Serial No. 540,279

8 Claims. (Cl. 260—41)

This invention relates to plastic compositions and more particularly to air hardening resinous plastics of putty-like consistency adapted for filling irregularities in wood and metal surfaces.

Putty compositions have long been employed in the automotive and other industries for filling and smoothing out surface defects prior to the application of protective and decorative coatings. These hitherto available putties have proven satisfactory for such purposes, but do not fulfill the more stringent requirements of shrinkage, adhesion and flexibility encountered at high altitudes, when such products are applied over irregularities in aircraft wing surfaces. In order to secure maximum speed with modern aircraft, it is imperative that the "drag" caused by irregularities in wing surfaces such as indentations around rivet heads, butt joints, overlaps, etc., be substantially eliminated. Conventional putties heretofore available fail to meet the severe requirements of such usage and therefore the attainment of increased speeds afforded by smoother wing surfaces has been undesirably impeded. The novel compositions of the present invention, however, are admirably suited for use in smoothing the exterior of aircraft structures, thereby contributing to greater speed performance.

This invention has as a primary object the provision of a putty composition particularly adapted for use on aircraft structures. Another object is the provision of a putty composition with superior working properties. Another object is the provision of a putty composition which affords improved adhesion to metal surfaces. Another object is the provision of an improved putty which has extraordinarily low shrinkage even at low temperatures. A further object is the provision of a putty composition which retains excellent flexibility at low temperatures encountered at high altitudes. A further object is the provision of an improved putty which is of such consistency as to permit easy application and working but which does not flow after application. A still further object is the provision of a putty composition which affords an unusually smooth surface after drying. Other objects will appear as the description of the invention proceeds.

These objects are accomplished in accordance with the present invention by means of a composition containing butyl or isobutyl methacrylate, interpolymers of butyl and isobutyl methacrylates or propyl methacrylate and a filler containing talc and colloidal china clay as essential ingredients in a volatile solvent vehicle which is present in such proportions as to provide a butter-like consistency. The preferred embodiment of the invention also contemplates the inclusion of a suitable plasticizer.

The following examples are given by way of illustration only and no limitations are intended thereby except as indicated in the appended claims.

Example 1

|  | Per cent by weight |
|---|---|
| 1st portion: | |
| N-butyl methacrylate polymer | 10.2 |
| Xylol | 1.4 |
| High solvency petroleum naphtha (B. R. 95–135° C.) | 12.0 |
| Colloidal china clay | 38.8 |
| Talc | 21.1 |
| Graphite | 2.2 |
| Chrome yellow pigment | 1.1 |
| Blown castor oil | 5.3 |
| 2d portion: | |
| N-butyl methacrylate polymer | 3.4 |
| Xylol | 4.0 |
| High solvency petroleum naphtha (B. R. 95–135° C.) | 0.5 |
| | 100.0 |

In the composition of this example, the colloidal china clay, which contributes largely to the improved properties of the new product, consists almost entirely of particles of below 10 microns in size. In fact, almost 87% of the material has a particle size of 3 microns or less and almost 50% is below 1 micron. The clay consists largely of silica and alumina, the analysis showing about 46% silica and about 39% alumina with about 14% ignition loss. Commercially known as #3 colloidal kaolin, it may be obtained from Hammill & Gillespie Inc., New York city.

The talc component of the composition which is included as a necessary ingredient for optimum results contributes to sanding properties and reduces any tendency toward "shortness" in the dried putty after application. Because of its low oil absorption, it can be added in greater quantities as an extender thus permitting higher total solids content in the final composition.

The graphite and chrome yellow pigment are added for the purpose of coloring only and may be substituted by other conventional pigment colors as desired.

The composition was prepared by dissolving the n-butyl methacrylate polymer in the xylol and high solvency petroleum naphtha after which the solution was charged into a kneading machine, such as a Werner and Pfleiderer mixer, together with the other materials of the "first portion" and mixed for four hours.

The resin solution of the "second portion" was then added and mixing continued for 30 minutes, until a homogeneous composition was secured.

The composition was employed as a putty by applying it with a putty knife over a conventional corrosion-resistant zinc chromate primer over irregularities in aircraft wing structures with extraordinarily successful results, particularly with respect to adhesion, retained flexibility and resistance to vibration at the low temperatures encountered during high altitude flying. The coating dried sufficiently in one hour at room temperature to permit sanding. Especially noteworthy also were the favorable working properties which permitted easy application and the desirable and novel effect of absence of flow in the composition after application. The surface of the dried putty was extremely smooth, thus contributing to the best "air flow" characteristics of the wing structures.

In the example, the proportion of filler to resin polymer binder is about 82 to 18 parts by weight and the proportion of colloidal clay to talc about 65:35 parts by weight. These proportions represent the optimum but as sugegsted hereinafter the proportions may be varied somewhat with acceptable results.

*Example 2*

1st portion: Per cent by weight
  Methacrylate resin interpolymer [1]_____ 7.0
  Xylol_____ 5.3
  High solvency petroleum naphtha (B.
    R. 95-135° C.) _____ 5.3
  Colloidal china clay_____ 24.7
  Talc_____ 30.0
  Carbon black_____ 0.2
  Titanium oxide_____ 2.9
  Resin-plasticizer [2] _____ 5.4

2d portion:
  Methacrylate resin interpolymer_____ 7.7
  Xylol_____ 5.7
  High solvency petroleum naphtha (B.
    R. 95-135° C.) _____ 5.8
                                         ─────
                                         100.0

[1] The methacrylate resin polymer used in this example consisted of an interpolymer prepared by copolymerizing equal parts by weight of n-butyl methacrylate monomer and isobutyl methacryltae monomer in accordance with methods well known in the art.
[2] The resin-plasticizer consisted of an 82% castor oil modified glycerol sebacate resin.

The total solids content of this composition is about 78% and the proportion of filler to resin polymer binder about 80 parts by weight of filler to 20 parts by weight of resin polymer binder. The proportion of colloidal china clay to talc is about 45:55 parts by weight.

The composition was prepared in accordance with the procedure described for Example 1 and when similarly tested was found to afford satisfactory results for the intended purposes previously suggested.

The n-butyl methacrylate polymer and n-butyl-isobutyl methacrylate interpolymer of the examples may be substituted directly with isobutyl methacrylate or propyl methacrylate with satisfactory results. It has been found, however, that ethyl and methyl methacrylate polymers are unsatisfactory in the present compositions because of a tendency to impart brittleness in the dried putty. On the other hand, alkyl ester polymers of methacrylic acid higher than the butyl ester likewise are unsuited because the product employing these polymers is too soft for present purposes.

In most instances, it is preferable to include a suitable plasticizer in the composition to increase flexibility. In addition to those shown in the examples, satisfactory plasticizers include dibutyl, dihexyl, diheptyl, cyclohexyl and dioctyl phthalates, tributyl phosphate, dibutyl tartrate, methoxyethyl phthalate, substituted toluene sulfonamides such as ethyl para toluene sulfonamide and triacetin.

The selection of the volatile vehicle is not critical and conventional solvents and diluents commonly employed with the methacrylate ester polymers may be used in the present composition. It is, however, desirable to obtain the highest solids content possible within the optimum range of butter-like consistency which affords best working properties. The solids content of the compositions may be varied between about 75% and 90% with best results being secured at a solids content of about 82%.

In the drawing the single figure represents a triangular graph showing areas in which operable and preferred compositions fall. In the graph the percentage compositions of resin, plasticizer and filler are plotted and those set forth below illustrate the invention, although in the figure the corners of the polygons representing the preferred and operable area compositions have been rounded.

Reference to the curve in the drawing indicates that in order to obtain compositions which are satisfactory for the preferred utilities of the present invention, specific proportions of the ingredients within a relatively narrow range should be employed. Acceptable putty compositions may be prepared without the inclusion of a plasticizer and in such instances the proportion of methacrylate resin polymer to filler (colloidal china clay, talc and pigment if desired) may be varied between about 18 and 30 parts by weight of resin to between 82 and 70 parts of filler. If the resin content is reduced below about 18 parts, the composition becomes somewhat brittle and if increased above about 30 parts, there is a tendency toward undesirable shrinkage. However, the preferred embodiment of the invention provides for the inclusion of up to about 9 parts of plasticizer which is substituted in part at least for the methacrylate resin polymer ingredient. Thus, when plasticizer is included to the extent of between about 0.5 and 9 parts by weight, the resin content may be varied between about 11 and 30 parts by weight and the filler between about 70 and 84 parts by weight. The preferred range of proportions of the essential ingredients as shown on the drawing is between about 15 and 21 parts by weight of methacrylate resin polymer to between about 5 and 8 parts by weight of plasticizer to between about 73 and 79 parts by weight of filler.

The proportion of the colloidal china clay to talc is likewise important. Satisfactory compositions may be prepared with proportions of between about 70 parts and 35 parts of colloidal china clay to between about 30 and 65 parts by weight of talc. The preferred range includes proportions between about 68 and 55 parts by weight of colloidal china clay to between 32 and 45 parts by weight of talc.

The most important commercial utility of the novel products of the present invention is concerned with aircraft construction, particularly for smoothing irregularities in wing surfaces, for example, filling indentations around rivet heads, butt joints, overlaps and surface imperfections. However, the compositions may also be employed advantageously for similar purposes in automotive bodies and fenders or for eliminating imperfections in metal surfaces generally. In addition, the products are useful for repair work for articles fabricated from wood, such as furniture, for filling imperfections in wood surfaces generally and for cold molding of various objects.

Many important and unique advantages are obtained in the products of the invention. After application, the composition dries and hardens in air at ordinary temperatures, requiring no baking or force drying treatment. It is stable for extended storage periods so that no precautions for handling or early use after manufacture are needed. The butter-like consistency characteristic is of value in that easy application even by unskilled labor is permitted. This unique property also prevents undesirable flow after application and during drying. The composition sets up rapidly to give a very smooth surface. The adhesion of the putty to metal surfaces is good and when applied over conventional primer coats such as corrosion-resistant zinc chromate primers, the adhesion is particularly superior especially when exposed to low temperatures. The superiority of the new putty over those hitherto available in low shrinkage and retained flexibility and resistance to failure from vibration at low temperatures encountered at high altitudes, is particularly marked. When employed in connection with smoothing irregularities in aircraft wing structures, speed performance of craft is improved.

As many apparently widely different embodiments of the invention may be made without departing from the spirit and scope thereof, it is to be understood that the invention is not limited to the specific embodiments thereof except as defined in the present claims.

I claim:

1. A coating composition of buttery consistency comprising a polymerized ester of methacrylic acid derived from a saturated aliphatic alcohol containing from 3 to 4 carbon atoms, and a filler comprising colloidal china clay and talc in the proportion of between 18 and 30 parts by weight of said methacrylate polymer to between 82 and 70 parts by weight of filler, the ratio of the colloidal china clay to talc in the said filler being between 70 and 35 parts of the clay to between 30 and 65 parts by weight of talc.

2. Composition of claim 1 in which substantially all of the particles of the colloidal china clay are below 10 microns in size.

3. Composition of claim 1 in which about 87% of the particles of the colloidal china clay are below 3 microns in size.

4. Composition of claim 1 in which the methacrylate polymer is derived from n-butyl alcohol.

5. Composition of claim 1 in which the methacrylate polymer is derived from propyl alcohol.

6. Composition of claim 1 in which the methacrylate polymer is an interpolymer of n-butyl and isobutyl methacrylate.

7. A coating composition of buttery consistency comprising a polymerized ester of methacrylic acid derived from a saturated alcohol containing from 3 to 4 carbon atoms, a filler comprising colloidal china clay and talc and a plasticizer in the proportion by weight of between 11 and 30 parts of said methacrylate polymer, between 70 and 84 parts of said filler and between 0.5 and 9 parts of plasticizer, the ratio of the colloidal china clay to talc in the said filler being between 70 and 35 parts of the clay to between 30 and 65 parts by weight of talc.

8. A coating composition of buttery consistency comprising a polymerized ester of methacrylic acid derived from a saturated alcohol containing from 3 to 4 carbon atoms, a filler comprising colloidal china clay and talc and a plasticizer in the proportion by weight of between 15 and 21 parts of said methacrylate polymer, between 73 and 79 parts of said filler and between 5 and 8 parts of plasticizer, the ratio of the colloidal china clay to talc in the said filler being between 70 and 35 parts of the clay to between 30 and 65 parts by weight of talc.

CHARLES W. JOHNSON.

REFERENCES CITED

The following references are of record in the file of this patent:

FOREIGN PATENTS

| Number | Country | Date |
|---|---|---|
| 411,860 | Great Britain | June 13, 1934 |